United States Patent
Huber

(10) Patent No.: US 8,503,027 B2
(45) Date of Patent: Aug. 6, 2013

(54) METHOD FOR ANGLE-DEPENDENT COLOR VALUE CORRECTION

(75) Inventor: Werner Huber, Wiesloch (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 695 days.

(21) Appl. No.: 12/730,389

(22) Filed: Mar. 24, 2010

(65) Prior Publication Data
US 2010/0242768 A1 Sep. 30, 2010

(30) Foreign Application Priority Data
Mar. 25, 2009 (DE) .......................... 10 2009 014 825

(51) Int. Cl.
*H04N 1/409* (2006.01)

(52) U.S. Cl.
USPC ........... 358/1.9; 358/3.26; 358/3.27; 101/485

(58) Field of Classification Search
USPC ................ 358/1.9, 3.26, 3.27; 382/162, 167; 101/484, 485; 702/127, 150
See application file for complete search history.

(56) References Cited

U.S. PATENT DOCUMENTS

| | | | | |
|---|---|---|---|---|
| 5,495,429 A * | 2/1996 | Craven et al. | .................. | 702/127 |
| 5,924,362 A * | 7/1999 | Volz et al. | .................... | 101/183 |
| 6,631,000 B1 | 10/2003 | Schwarz | | |
| 6,809,837 B1 * | 10/2004 | Mestha et al. | .................. | 358/1.9 |
| 7,283,244 B2 | 10/2007 | Takagi | | |
| 7,515,267 B2 | 4/2009 | Ehbets et al. | | |
| 7,528,955 B2 | 5/2009 | Orelli et al. | | |
| 7,551,317 B2 | 6/2009 | Engler et al. | | |
| 7,760,397 B2 * | 7/2010 | Hosier | .......................... | 358/1.9 |
| 7,808,676 B2 | 10/2010 | Huber et al. | | |
| 2002/0122192 A1 * | 9/2002 | Ott | ................. | 358/1.9 |
| 2004/0066515 A1 * | 4/2004 | Ott | ................. | 356/418 |
| 2005/0018219 A1 * | 1/2005 | Senn et al. | .................... | 358/1.8 |
| 2006/0076415 A1 | 4/2006 | Reichenbach et al. | | |
| 2006/0193512 A1 | 8/2006 | Orelli et al. | | |
| 2006/0230967 A1 * | 10/2006 | Rich | ........................... | 101/484 |
| 2007/0091138 A1 * | 4/2007 | Hersch et al. | ................... | 347/19 |
| 2007/0227389 A1 | 10/2007 | Huber et al. | | |
| 2007/0291291 A1 * | 12/2007 | Vilar et al. | .................... | 358/1.9 |
| 2010/0082287 A1 * | 4/2010 | Bonino et al. | ................ | 702/150 |
| 2010/0177192 A1 * | 7/2010 | Ishigaki | ........................ | 348/135 |

FOREIGN PATENT DOCUMENTS

| | | |
|---|---|---|
| CN | 101045373 A | 10/2007 |
| DE | 19950588 A1 | 4/2001 |
| DE | 102004021599 A1 | 12/2005 |
| DE | 102004046461 A1 | 3/2006 |
| DE | 102007041390 A1 | 3/2009 |

(Continued)

OTHER PUBLICATIONS

German Search Report dated Nov. 5, 2009.

*Primary Examiner* — Kimberly A Williams

(74) *Attorney, Agent, or Firm* — Laurence A. Greenberg; Werner H. Stemer; Ralph E. Locher

(57) ABSTRACT

A method for registering color measured values on printing materials with a color sensor includes registering the color measured values on the printing materials at different angles of observation of the color sensor. The angular dependence of the color measured values registered on the printing materials at different angles of observation is corrected in a computer.

9 Claims, 1 Drawing Sheet

FOREIGN PATENT DOCUMENTS

| | | |
|---|---|---|
| DE | 102008010562 A1 | 9/2009 |
| EP | 1353156 A2 | 10/2003 |
| EP | 1645839 A1 | 4/2006 |
| EP | 1694048 A1 | 8/2006 |

* cited by examiner

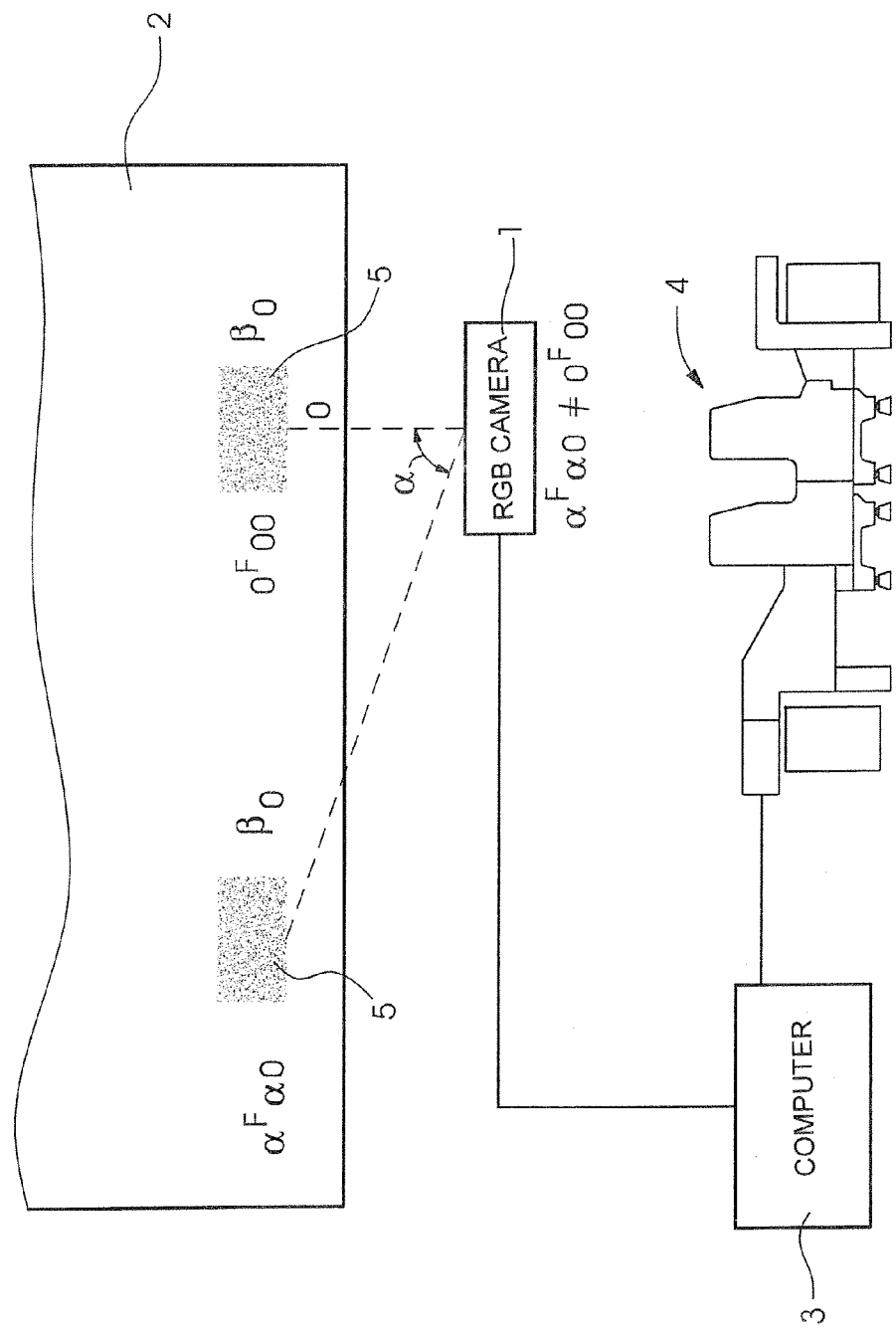

METHOD FOR ANGLE-DEPENDENT COLOR VALUE CORRECTION

CROSS-REFERENCE TO RELATED APPLICATION

This application claims the priority, under 35 U.S.C. §119, of German Patent Application DE 10 2009 014 825.6, filed Mar. 25, 2009; the prior application is herewith incorporated by reference in its entirety.

BACKGROUND OF THE INVENTION

Field of the Invention

The present invention relates to a method for registering color measured values on printing materials through the use of a color sensor, in which color measured values are registered on the printing materials at different angles of observation of the color sensor.

The colors of printing materials which are produced on printing presses are measured through the use of a color measuring instrument and the measured values are compared with corresponding values from a printing original, for the purpose of quality control. The printing materials are rejected if there are excessively large deviations between the measured values on the printing materials and the values from the printing original. Such rejects must be avoided to the greatest possible extent, since they cause unnecessary costs and cannot be sold. While in the past printing materials were measured outside the printing press, for which purpose a proof sheet was taken from the printing press at specific time intervals, now so-called in-line color measuring systems, which are disposed in a printing unit belonging to the printing press and register the printing materials during the printing operation, preferably in the last printing unit, have become more and more widespread. In that way, it is possible to perform color measurements on any printing material. Due to high printing speeds, printing materials are currently not measured over their complete area in the printing press but only in the region of a print control strip, which contains corresponding color measuring areas. Cameras are increasingly intended to be used as the color measuring instrument, since they are less expensive than spectrometers. By their nature, cameras have an objective with a wide aperture angle and it is necessary to ensure that identical colors on the printing material are measured irrespective of the angle of observation, i.e. the position of the color area to be measured on a subject line. That means that the registered color values of the color must be independent of the position of the colored area being measured. However, that is not so in the case discussed herein, for various reasons. Firstly, the objectives of such cameras are not completely color-corrected or there are color filters which are applied to the pixels of a CCD matrix of the camera and which, when transilluminated at different angles, absorb the registered spectra differently.

If, then, such a camera is used as a color measuring and color control system, that leads to color values measured at different angles not being comparable, even in the event of identical coloration of the original. Therefore, with the previous camera systems, no reliable quality control of the color produced on printing materials was possible.

SUMMARY OF THE INVENTION

It is accordingly an object of the invention to provide a method for registering color measured values on printing materials using a color sensor, which overcomes the hereinafore-mentioned disadvantages of the heretofore-known methods of this general type and in which color measured values can be registered on printing materials at different angles of observation of the color sensor but which are nevertheless comparable with one another.

With the foregoing and other objects in view there is provided, in accordance with the invention, a method for registering color measured values on printing materials with a color sensor. The method comprises registering the color measured values on the printing materials at different angles of observation of the color sensor, and correcting an angular dependence of the color measured values registered on the printing materials at different angles of observation in a computer.

The method according to the invention is suitable, in particular, for measuring the color of printing materials through the use of RGB cameras in the printing press. In order to ensure the angular independence of color measured values registered at different angles of observation of the RGB camera, according to the invention the RGB camera is connected to a computer, which corrects by computation the angular dependence of the color measured values registered on the printing materials at different angles of observation. This computational correction makes it possible to compare color measured values registered even at different angles of observation with one another and in this way to be able to check the printing quality of printing materials. This is necessary, since the camera carries out many color measurements on the printing material in various areas of the printing material and therefore at different angles of observation.

In accordance with another mode of the invention, provision is made for the correction to the angular dependence to be carried out by the computer through the use of a correction function. A color value is brought about by a color, a spectrum, being convoluted with an angle-dependent spectral value function. This angle-dependent function is then corrected again in the computer by a correction function in such a way that the color measured values are angle-independent in the final effect. The correction function is consequently a mathematical computational rule which eliminates the angular dependence of the registered color measured values. A correction function of this type may be determined by the spectrum of a color to be measured being stored in the computer for at least one angle. This is preferably the spectrum at the angle $\alpha=0$. This spectrum, then provided with the correction function, is converted into a spectrum adapted as a function of the respective camera angle. For this purpose, in a further refinement of the invention, use is made of so-called angle-dependent spectral value functions. These angle-dependent spectral value functions can once more be created in a number of ways. In order to eliminate the angular dependence, the angle-dependent spectral value functions must be converted into angle-independent spectral value functions, with the conversion in each case depending on the current angle of observation. In this case, the angular dependence can be obtained by one-time measurement of the camera in the laboratory, and the stored measured values can be stored in the computer as angle-dependent correction values.

In accordance with a further mode of the invention, as an alternative, provision is made for the correction function to be determined through the use of a color model which, on the basis of a known spectrum of a known ink layer thickness, calculates the spectrum to be expected at another ink layer thickness. In this way, it is possible to approximate on the computer, through the use of the color model, the spectral reflectance (spectrum) not measured at another angle $\alpha$ through the use of the spectral reflectance determined once at the angle α=0 and stored. In this color model, the spectrum to be expected at another ink layer thickness is calculated on the basis of a known spectrum at a known ink layer thickness.

In accordance with an added mode of the invention, provision is made for the computer to be connected to a printing press and for the inking in inking units of the printing press to be controlled. The color measured values from the camera in the color measuring system, corrected through the use of the method of the invention, can then be compared with the comparable values from the printing original and, in the event of deviations, the computer can intervene appropriately in the control of the inking units of the printing press and compensate for deviations between the measured actual values and the desired values from the printing original, by the color control being adapted appropriately.

In accordance with an additional mode of the invention, as already mentioned at the beginning, the color sensor being used can, in particular, be an RGB camera, with it being possible for the color sensor to be implemented as an in-line measuring instrument in the printing press or else as an off-line measuring instrument outside the printing press with a separate measuring table or else as a handheld measuring instrument. In order to calibrate the color sensor, in particular when an RGB camera is employed, a spectral measuring head can also further be used, which at least to some extent likewise registers the measured points registered by the RGB camera and the measured values of which are used to calibrate the RGB camera. Through the use of the RGB camera calibrated in this way, the color of a printing material can then be measured over a large area without any further assistance of the spectral measuring head, even in the printed image.

In accordance with a concomitant mode of the invention, provision is further made for the color sensor to register a plurality of identical colored areas on a printing material at different angles of observation. Both in the case of sheet printing materials and in the case of printed webs in offset printing presses, it is usual for so-called color measuring strips to be accommodated in the edge region, including periodically applied color measuring areas in a plurality of colors and gray steps. To this end, the color sensor is made capable of registering a plurality of identically colored color measuring areas simultaneously. However, since these identically colored color measuring areas are applied at different locations in the color measuring strip, they are consequently registered by the color sensor at different angles of observation. On the basis of the angular correction according to the invention, these color measured values registered in this way can nevertheless be corrected in accordance with their different angles of observation and registered as reliable actual values and used in the computer for the comparison with the printing original.

Other features which are considered as characteristic for the invention are set forth in the appended claims.

Although the invention is illustrated and described herein as embodied in a method for angle-dependent color value correction, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing includes a side-elevational view of a sheet-fed offset printing press and a block diagram of a connected computer and a connected RGB camera which makes color measurements at different angles of observation on a printing material which is shown in a fragmentary, top-plan view.

DETAILED DESCRIPTION OF THE INVENTION

Referring now in detail to the single FIGURE of the drawing, there is seen a diagrammatically-illustrated sheet-fed offset printing press 4. The sheet-fed offset printing press 4 includes, by way of example, two printing units, a feeder and a delivery. Furthermore, the printing press 4 is connected to a computer 3, which is also used at the same time as a control computer of the printing press 4. An RGB camera 1 which, in this case, registers sheet-shaped printing materials 2, is in turn connected to the computer 3 as a color sensor. In the illustrated FIGURE, the color of the printing materials 2 is measured outside the printing press 4. However, it is also possible for the camera 1 to be disposed in one of the printing units, preferably in the last printing unit of the printing press 4, and to register the printing materials 2 directly in the printing press. In the figure, it can be seen that two identically colored areas 5 are registered at different angles of observation α. The right-hand colored area 5 is registered at an angle of observation α=0, with a corresponding color value $_0F_{00}$ being registered by the camera 1. The left-hand colored area 5 is registered at an angle of observation α≠0, so that another color value $_\alpha F_{\alpha 0}$ is registered. The two color values differ from each other because of the different angle of observation α.

However, it is important for the comparison with the printing original that the two color values be identical, since the differences result only from the different angle of observation and are not reflected in the actual color. For this reason, the angle-dependent color value $_\alpha F_{\alpha 0}$ must be corrected appropriately. In both cases, the spectral reflectance $\beta_0$ is the same. While the spectral reflectance $\beta_0$ is present in the right-hand case, a different spectral reflectance $\beta_\alpha$ is present in the left-hand case. However, only the spectral reflectance $\beta_0$ which is angle-independent by definition is known in the computer 3. Consequently, the angular dependence of $\beta_\alpha$ must be replaced by a correction function which contains the single known spectral reflectance $\beta_0$. The spectral reflectance $\beta_0$ can in turn be determined by the one-time, unique or non-recurrent spectrophotometric measurement of the corresponding colored area during a print job at the angle of observation α=0. This procedure will be explained in more detail below.

Color Measurement: Angular Dependence of the Color Value

An identical reflectance of a color $\beta_0$ will not be converted into identical color values F by the camera 1, depending on the angle of observation α.

$$\beta_\alpha \qquad \beta_0$$
$$_\alpha F_{\alpha 0} = \sum \mathcal{F}_\alpha^* \beta_0 \qquad _0F_{00} = \sum \mathcal{F}_0^* \beta_0$$

$$\searrow \qquad \swarrow$$

$$\text{camera}$$
$$_\alpha F_{\alpha 0} \neq {}_0F_{00}$$

For the nomenclature:

$_\alpha F_{\pi 0}$: color value at position a produced by spectral function $\mathcal{F}_\pi$ and spectrum $\beta_\alpha$ with F={R,G,B} as trivalent color value.

The reason is the angular dependence of the camera spectral value functions $\mathcal{F} = \mathcal{F}(\alpha)$.

In general:

$$\beta_\alpha \neq \beta_0$$
$$_\alpha F_{\alpha\alpha} = \Sigma \mathcal{F}_\alpha^* \beta_\alpha \qquad _0F_{00} = \Sigma \mathcal{F}_0^* \beta_0$$

camera
$_\alpha F_{\alpha\alpha} \neq {_0F_{00}}$

On the other hand, angular independence means: identical spectral value functions for all angles.

$\mathcal{F} \neq \mathcal{F}(\alpha) \rightarrow$ all $\mathcal{F}_\alpha$ must be replaced by $\mathcal{F}_0$. The position $\alpha = 0$ is designated angle-independent by definition, since it represents the reference and the common datum.

Color Measurement: Angular Correction of the Color Value

The problem is that in general $\beta_\alpha$ is unknown.

On the other hand, the following are known:

$_\alpha F_{\alpha\alpha}$ and $_0F_{00}$ through current measurement of the two colors with the camera 1

$\mathcal{F}_\alpha$ and $\mathcal{F}_0$ through one-time measurement of the camera 1 in the laboratory of the manufacturer $\beta_0$ through spectrophotometric measurement of the printing material 2 during the print job What is ultimately looked for is the color value F of the color $\beta_\alpha$ measured at the angle $\alpha$ but weighted with the angle-independent spectral value function $\mathcal{F}_0$: $_\alpha F_{0\alpha} = \Sigma \mathcal{F}_0^* \beta_\alpha$ Since $\beta_\alpha$ is generally unknown, $\beta_\alpha$ must be represented by $\beta_0$:

$\beta_\alpha \leftarrow \beta_0(s)$ with s as a layer thickness in accordance with a color model.

Then s is determined in such a way that:

$$|_\alpha F_{\alpha\alpha} - _\alpha F_{\alpha 0}(s)| \rightarrow \min$$

is true, with $_\alpha F_{\alpha 0}(s) = \Sigma \mathcal{F}_\alpha^* \beta_0(s)$ Then replace $$_\alpha F_{\alpha\alpha} = \Sigma \mathcal{F}_\alpha^* \beta_\alpha \text{ by } _\alpha F_{00}(s) = \Sigma \mathcal{F}_0^* \beta_0(s) \sim {_\alpha F_{0\alpha}} = \Sigma \mathcal{F}_0^* \beta_\alpha$$

The following criterion serves as a measure of quality of the method "representing the unknown reflectance $\beta_\alpha$:"

$$d\text{RGB} = |_\alpha F_{\alpha\alpha} - _\alpha F_{\alpha 0}(s)| \rightarrow \min$$

The criterion:

$$d\text{RGB} = |_\alpha F_{0\alpha} - _\alpha F_{00}(s)| \rightarrow \min$$

is used as a measure of the quality of the method "replacing $_\alpha F_{\alpha\alpha}$ by $_\alpha F_{00}(s)$" with the reflectance $\beta_0$ measured (for this purpose).

The central concept of this exemplary embodiment is to approximate the unmeasured reflectance $\beta_\alpha$ by the measured reflectance $\beta_0$ through the use of a color model. The color model is prior art and has the function of calculating the spectrum to be expected at another layer thickness, on the basis of a known spectrum and a known layer thickness. Therefore, to an extent that is close to practice, it is possible to simulate similar colors by computation as a spectrum with the free parameter of a relative layer thickness. This replacement is controlled by the measure of quality "representing the unknown reflectance $\beta_\alpha$," which determines the similarity of the measured to the calculated color value at the position $\alpha$. The color value which is achieved through the reflectance at the position $\alpha$ and through the spectral value function $\mathcal{F}$ at the same position is replaced by the color value through the approximated spectrum and through the spectral value function $\mathcal{F}$ to be used at all positions.

The invention claimed is:

1. A method for registering color measured values on printing materials with a color sensor, the method comprising the following steps:
    registering the color measured values on the printing materials at different angles of observation of the color sensor; and
    correcting an angular dependence of the color measured values registered on the printing materials at different angles of observation in a computer with a correction function; and
    determining the correction function by a color model which, on a basis of a known spectrum at a known ink layer thickness, calculates a spectrum to be expected at another ink layer thickness.

2. The method according to claim 1, wherein a spectrum of the measured color for at least one angle is known to the computer.

3. The method according to claim 1, which further comprises carrying out the step of correcting the angular dependence in the computer by taking angle-dependent spectral value functions into account.

4. The method according to claim 3, which further comprises setting up the angle-dependent spectral value functions by one-time measurement of the color sensor and storing in the computer.

5. The method according to claim 1, wherein the color sensor is an RGB camera.

6. The method according to claim 1, wherein the color sensor is disposed in a printing press.

7. The method according to claim 1, wherein the color sensor registers a plurality of identical colored areas on a printing material at different angles of observation.

8. A method for registering color measured values on printing materials with a color sensor, the method comprising the following steps:
    registering the color measured values on the printing materials at different angles of observation of the color sensor;
    correcting an angular dependence of the color measured values registered on the printing materials at different angles of observation in a computer;
    connecting the computer to a printing press; and
    controlling inking in inking units of the printing press with the computer.

9. The method according to claim 8, wherein the color sensor is disposed in the printing press.

* * * * *